United States Patent
Dünnebacke

[11] Patent Number: 5,874,888
[45] Date of Patent: Feb. 23, 1999

[54] CAR RADIO WITH AN ANTI-THEFT DEVICE

[75] Inventor: Joachim Dünnebacke, Herborn, Germany

[73] Assignee: VDO Control Systems, Inc., Cheshire, Conn.

[21] Appl. No.: 726,707

[22] Filed: Oct. 7, 1996

[30] Foreign Application Priority Data

Oct. 7, 1995 [DE] Germany ............... 195 37 419.3

[51] Int. Cl.⁶ .................................................. B60R 25/10
[52] U.S. Cl. ............... 340/426; 340/425.5; 340/428; 340/438; 340/568; 307/10.2; 307/10.3; 180/287
[58] Field of Search ................. 340/425.5, 426, 340/428, 438; 307/10.2, 10.3, 10.4, 10.5; 180/287

[56] References Cited

U.S. PATENT DOCUMENTS

| | | | |
|---|---|---|---|
| 4,494,114 | 1/1985 | Kaish | 340/571 |
| 4,679,026 | 7/1987 | Kuakowski et al. | 340/568 |
| 4,683,462 | 7/1987 | Takeda et al. | 340/571 |
| 4,720,700 | 1/1988 | Seibold et al. | 340/568 |
| 4,734,896 | 3/1988 | Soma et al. | 340/568 |
| 4,743,894 | 5/1988 | Bochmaun | 340/568 |
| 4,808,981 | 2/1989 | Seibold | 340/568 |
| 4,866,416 | 9/1989 | Halzhauer et al. | 340/426 |
| 5,091,856 | 2/1992 | Hasegawa et al. | 180/287 |

FOREIGN PATENT DOCUMENTS 3717054  5/1987  Germany .

*Primary Examiner*—Nina Tong
*Attorney, Agent, or Firm*—Richard A. Speer; Mayer Brown & Platt

[57] ABSTRACT

A car radio with an electronic anti-theft device, which device includes circuitry for electrically detecting the removal of the car radio from its build-in recess, and by which the function of the car radio is blocked as long as the anti-theft device is not deactivated after the removal. A simple arrangement with a highly reliable mode of operation is obtained in that the circuitry for electrically detecting the removal of the car radio includes a monitoring circuit, by which the presence of a connection from the car radio to at least one loudspeaker is monitored continuously, and by which the anti-theft device is activated immediately after the interruption of this connection.

6 Claims, 1 Drawing Sheet

CAR RADIO WITH AN ANTI-THEFT DEVICE

BACKGROUND OF THE INVENTION

1. Field of the Invention

The invention relates to a car radio with an electronic anti-theft device, which device comprises means for electrically detecting the removal of the car radio from its build-in location, and by which the function of the car radio is blocked as long as the anti-theft deice is not deactivated after the removal.

2. Description of the Related Art

German Patent DE-PS 37 17 054, corresponding to U.S. Pat. No. 4,808,981, is known a car radio with an electronic anti-theft device, this device comprising a memory for a codeword, means for entering the codeword, as well as means for electrically detecting a removal of the car radio from its build-in location, means blocking the functioning of the car radio as long as the codeword is not entered after the removal. To create a purely electronic anti-theft device which can neither be outwitted with an additionally connected battery, nor requires the use of an electronic key activating the circuit arrangement, the known car radio comprises a circuit arrangement which measures the impedance on at least one connecting terminal of the car radio when the device is switched on, compares the measured impedance value to the stored impedance value established previously at the build-in location and, when different values occur, blocks the functioning of the car radio until the right codeword is entered. Preferably, the impedance measurement is made on at least one loudspeaker terminal, while a signal generated in an AC voltage generator is applied to the loudspeaker terminal via a switch to measure the impedance. The impedance value on the loudspeaker terminal is then determined on the basis of the measured voltage on the loudspeaker terminal and on the basis of the AC current flowing through the loudspeaker circuit.

The codeword is to be entered in this car radio after it is built in and, simultaneously, the impedance value present on the loudspeaker terminal is to be entered in the memory as a digital value. For this purpose, the impedance value determined with said circuit arrangement is applied via an A/D converter to a microprocessor and written in the memory by this microprocessor. When the car radio is put in operation again, the microprocessor compares the impedance value present on the loudspeaker terminal to the impedance value stored in the memory when the car radio was put in operation for the first time. If the two values match, the car radio starts operating. If the two values do not match, the functioning of the car radio is blocked and the user is requested to enter the codeword. In the case of an authorized removal of the car radio from the vehicle, the entry of the codeword thus makes it possible to have the car radio operate again even, for example, with different loudspeakers.

Apart from a substantial cost of circuitry for the impedance measurement, the storing of the measured impedance values and the comparison of a newly measured impedance value to the stored impedance value shows that this anti-theft device does not provide a satisfactory protective function either. In the case of unauthorized removal of the car radio, it is possible to circumvent the compulsion of entering the codeword if, prior to the renewed, this time unauthorized operation, for example, loudspeakers are connected whose electrical characteristic values correspond to those from the vehicle of the authorized user. Such a circumvention of the anti-theft device may be facilitated in that, for example, the impedance values of loudspeakers for car radios are standardized. In order to avoid such a circumvention of the anti-theft device, a high-resolution impedance value should be determined by means of an accordingly high-cost impedance measurement. However, this may lead to the fact that already existing different transfer resistances on the connecting terminal, lead to the anti-theft device also being triggered by the authorized user. This also makes it difficult for the authorized user to handle the car radio; more particularly, the handling is affected by variations of the physical parameters which are inestimable for him.

In this case, the car radio described in DE-PS 37 17 054 does not have an advantage compared with the car radio in which, basically, after each disconnection, for example, from the battery of the motor vehicle, the codeword is required to be entered. But also a blocking of the car radio, when the operating voltage from the battery of the motor vehicle is interrupted, is hardly advantageous despite its simple realization, because it is useless in the cases where the car radio is stolen with connected voltage supply. Furthermore, it has appeared that the blocking of the above type causes problems, for example, during so-called start or load dump operations. By storing the voltage in capacitors inside the car radio, it is also possible to slow down the activation of the anti-theft device, i.e., the blocking of the car radio, so that in certain cases, the activation can be disturbed or prevented or is disturbed, respectively.

SUMMARY OF THE INVENTION

It is an object of the invention to provide a car radio with an anti-theft device which can be activated rapidly and reliably.

According to the invention, this object is achieved in a car radio of the type defined in the opening paragraph, in that the means for electrically detecting the removal of the car radio comprise a monitoring circuit which continuously monitors the presence of a connection of the car radio to at least one loudspeaker and by which the anti-theft device is immediately activated upon detection of the interruption of this connection.

The invention also utilizes the fact that the connection of the car radio to the loudspeaker(s) is interrupted when the car radio is removed. Contrary to the state of the art according to DE-PS 37 17 054, the anti-theft device according to the invention is activated already immediately after the car radio has been removed. On the one hand, this enhances the protection, because the period of time for possible manipulations of the anti-theft device is shortened decisively and even by the period of time during which the car radio is outside its build-in location. Furthermore, according to the invention, the loudspeaker connection is monitored continuously during the whole period in which the car radio is present in the build-in location. If removed from the build-in location, this monitoring inevitably leads to the anti-theft device being activated; the anti-theft device is not deactivated by the monitoring circuit or the means for electrically detecting the removal of the car radio. After the removal of the car radio, the anti-theft device can no longer be circumvented in this manner, even if exactly matching connection conditions are re-established. In addition, with the car radio according to the invention there is an immediate reaction to the removal, which reaction is not delayed or disturbed by energy stores in the car radio. Even problems with an activation in the case of start or load dump procedures no longer occur.

A further embodiment of the invention is based on the recognition that all loudspeaker arrangements used in connection with car radios always establish an electric connection via the moving coils of the loudspeakers starting from the car radio terminals. This electric connection can be influenced very simply by a constant current, and be monitored. The voltage on the electric connection developed by this constant current, which voltage adopts a proportionally low value, is weighted as a signal for the presence of the connection. If, on the other hand, the electric connection is interrupted, said voltage rises; this is recognized as a signal of the interruption and thus the removal of the car radio from the build-in location. Thus, a costly impedance measurement is not necessary; the described test of the connection can be effected in a continuous-time manner with a simple analog comparator stage. For this comparator stage, it is possible to predefine a voltage threshold which, when exceeded by the voltage on the connection from the car radio to the loudspeaker(s), assumes an interruption of this connection or detects an interruption, respectively.

The monitoring circuit of the car radio, according to the invention, may be simply used for an additional activation of the anti-theft device each time the car radio is put out of operation, in which the car radio farther remains in his build-in location (without disconnections). For this purpose, a signal may additionally be applied to the monitoring circuit, which signal contains information whether the car radio is switched on or not and by which the anti-theft device is activated when the car radio is switched off.

Also with the car radio according to the invention, the anti-theft device may preferably be deactivated when a signal containing a codeword is applied. In this respect, the invention fits in with the usual codeword technique.

These and other aspects of the invention will be apparent from and elucidated with reference to the embodiments described hereinafter.

DESCRIPTION OF THE PREFERRED EMBODIMENTS

Figure 1A:
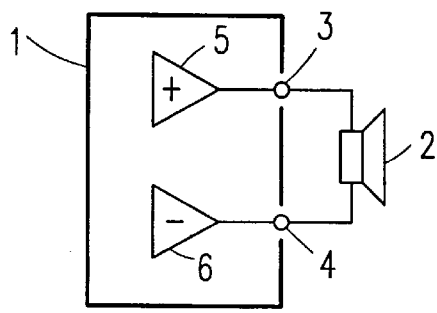
FIGS. 1a–1d show current possibilities of the connection between a car radio and one or more loudspeakers.

FIG. 1a a basic circuit diagram of the connection between a car radio 1 and a loudspeaker 2 via two terminals 3, 4. The car radio 1 comprises a bridge output stage which has a non-inverting and an inverting output amplifier 5, 6 respectively, whose outputs form the terminals 3 and 4 respectively. There is an electric connection between the terminals 3 and 4 via the moving coil of the loudspeaker 2.

Figure 1B:
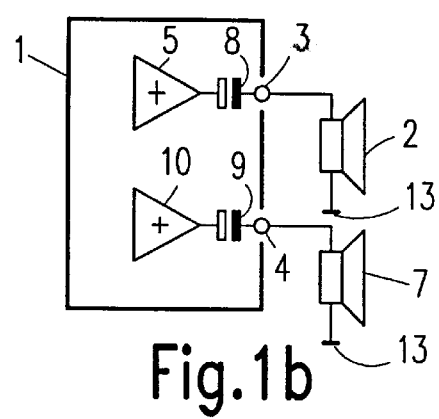

FIG. 1b, in which, as hereafter, like elements are again designated by like reference characters, a stereo output stage with a second loudspeaker 7 in addition to the first loudspeaker 2. The loudspeakers are connected to ground via the terminals 3 and 4, respectively. There is thus an electric connection between the terminals 3 and 4 via the moving coils of the loudspeakers 2 and 7 and ground. The fact that between the output of the non-inverting output amplifier 5 and the terminal 3, a capacitor 8 is inserted, preferably an electrolyte capacitor, does not harm this electric connection. A further capacitor 9 links the terminal 4 to the output of the second non inverting output amplifier 10 which supplies power to the second loudspeaker 7.

Figure 1C:
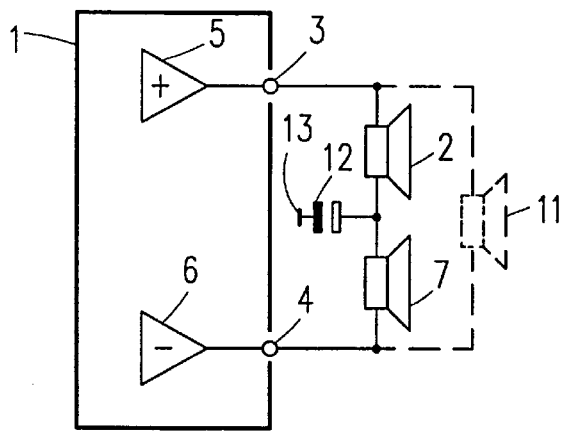

FIG. 1c an interchangeable output stage for a car radio to which a series combination of two loudspeakers 2, 7, or a single loudspeaker 11 (at any rate via the terminals 3, 4) can optionally be connected. Optionally—as is shown in FIG. 1c the junction between the loudspeakers 2 and 7 is connected to ground 13 via a capacitor 12, preferably an electrolyte capacitor. The terminal 3 is again formed by the output of a non-inverting output amplifier S. the terminal 4 by the output of an inverting output amplifier 6.

Figure 1D:
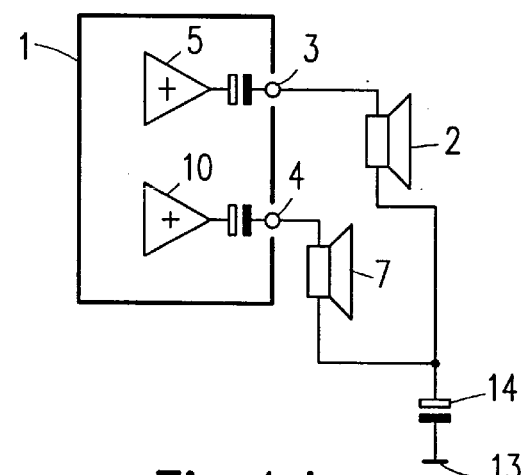

FIG. 1d an output stage for two loudspeakers 2, 7 which, on the one hand, are linked each to one of the terminals 3, 4 and, on the other hand, are jointly linked to ground 13 via a capacitor 14 (output coupling electrolyte capacitor). The terminal 3 is formed by the output of a first non-inverting output amplifier 5, the terminal 4 by the output of a second non-inverting output amplifier 10. In the FIGS. 1c and 1d, the loudspeakers 2, 7 are connected in series between the terminals 3, 4; their moving coils establish the electric connection between the terminals 3, 4.

Figure 2:
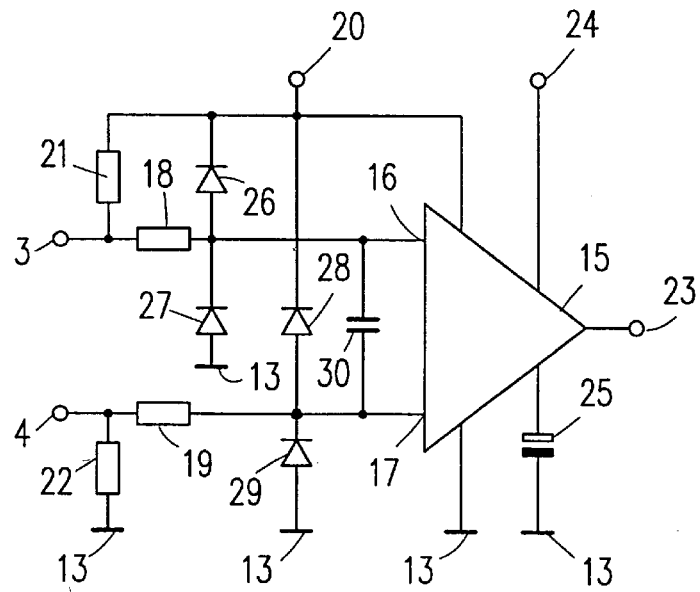
FIG. 2 shows a monitoring circuit according to the invention.

In each of the cases represented in FIGS. 1a–1d, an interruption of the connection between the car radio 1 and the loudspeaker(s) 2, 7 or 11 leads to an interruption of the described electric connection. The electric connection or the detection of its interruption is effected via a monitoring circuit whose major elements are shown in FIG. 2. The arrangement shown in FIG. 2 comprises a comparator stage 1S having a first input (plus input) 16, which is linked to the terminal 3 via a first input resistor 18, and to a second input (minus input) 17, which is linked to the terminal 4 via a second input resistor 19. The terminals 3, 4 then correspond to those of FIGS. 1a–1d. From a constant current supply terminal 20, which is directly, i.e., without an operational inhibit device, connected to a voltage source, preferably the battery of the motor vehicle, there is a link to the terminal 3 via a preferably high-ohmic first constant current supply resistor 21. The second constant current supply resistor 22 is inserted between the terminal 4 and ground 13. The comparator stage 15 is also supplied with power from the constant current supply terminal 20.

As long as the car radio is present in its build-in location, the described electric connection is effected via the loudspeakers 2, 7 and 11. Via these loudspeakers and the constant current supply resistors 21 and 22, a constant current flows between the constant current supply terminal 20 and ground 13. This constant current, working as a pilot current, however, causes a very small voltage to occur in the proportionally lowohmic electric connection through the moving coils of the loudspeakers. The comparator stage 15 comprises a circuit arrangement for providing a voltage threshold which is higher than the voltage occurring on the electric connection. A high-level logic signal is then produced on the output 23 of the comparator 15, which signal can be applied to an anti-theft device and this device signals an undisturbed state of the loudspeaker connections. If the electric connection between the terminals 3 and 4 is interrupted, the voltage between the inputs 16 and 17 of the comparator stage 15 will exceed the voltage threshold. A lower logic level then appears on the output 23 of the comparator stage 15. This lower logic level activates the anti-theft device. Preferably, this device is arranged in such a way that a renewed change to a high logic level on output 23 does not lead to a deactivation. This may preferably be effected only if a signal containing a codeword is applied to the anti-theft device.

The described arrangement comprising the comparator stage 15 is structured so that customary output amplifiers can also receive on their outputs in the so-called standby mode a direct voltage which exceeds the voltage threshold, without this leading to a noticeable change of the operating state of the output amplifiers.

The comparator stage 15 shown in FIG. 2 has an inhibit input 24 via which the comparator stage and thus the monitoring circuit, which includes this comparator stage, can additionally be supplied with a signal which contains information about whether the car radio is switched on or not, for example, a signal derived from the supply voltage for the car radio 1 after an on-off switch controlling the energy supply to this car radio. If the inhibit input signals that the car radio 1 is switched off, the output 23 of the comparator stage 15 is consequently switched to the low logic level. Also the switching off of the car radio 1 thus activates the anti-theft device.

When the voltage on the constant current supply terminal 20 breaks down, thus, for example, when there is an interruption of the connection from the constant current supply terminal 20 to the battery of the motor vehicle, the anti-theft device can be activated by the circuit arrangement shown in FIG. 2. In order to be able, in that case, to produce a reliable signal for activating the anti-theft device through output 23, the comparator stage 15 may be connected to an auxiliary capacitor 25 which is also connected ground 13 in FIG. 2. This auxiliary capacitor 25, preferably an electrolyte capacitor, represents an additional energy store, which maintains the energy supply to the comparator circuit 15 included in the monitoring circuit, i.e., maintains the operating voltage to this comparator circuit for a specific period of time after a supply voltage to car radio 1 has failed.

As a result, with little circuitry, also a monitoring of the connection of the car radio 1 to the battery of the motor vehicle is included in the anti-theft device.

The inputs 16, 17 of the comparator stage 15 are connected to an over-voltage protection to avoid damage of the comparator stage 15 when the car radio 1 is used with uninterrupted connections to the loudspeakers 2, 7 and 11, respectively. Depending on the configuration of the respective loudspeakers 2, 7 and 11 to be connected, completely different voltages may also occur on the terminals 3 and 4. The over-voltage protection arrangement comprises a first diode 26 between the constant current supply terminal 20 and the first input 16, a second diode 27 between the first input and ground 13, a third diode 28 between the constant current supply terminal 20 and the second input 17 and a fourth diode 29 between the second input 17 and ground 13. The input resistors 18 and 19 respectively, form current limiting resistors for the over-voltage protection arrangement. A capacitor 30 is inserted between the inputs 16 and 17.

The described comparator circuit for the car radio according to the invention may, for example, be formed by discrete building blocks, as a separate integrated circuit or be part of a sub-set comprising the output amplifiers 5, 6 and 10.

It is to be recommended to have an interference-free arrangement of the connecting lines from the car radio 1 to the loudspeakers 2, 7 and 11 to avoid the monitoring circuit being influenced as a result of crosstalk interference.

I claim:

1. A car radio with an electronic anti-theft device which device comprises means for electrically detecting the removal of the car radio from its build-in location and by which the function of the car radio is blocked as long as the anti-theft device is not deactivated after the removal, characterized in that the means for electrically detecting the removal of the car radio comprise a monitoring circuit which continuously monitors the presence of a connection of the car radio to at least one loudspeaker while the car radio is present in said built-in location and by which the anti-theft device is immediately activated without delay due to energy stores in the car radio upon detection of the interruption of this connection.

2. A car radio with an electronic anti-theft device as claimed in claim 1, characterized in that the monitoring circuit comprises means for triggering the connection from the car radio to the at least one loudspeaker by a constant current as well as a comparator stage for testing a voltage caused to arise on the connection by the constant current, while a transgression of a predefinable voltage threshold on the connection is detected by the comparator stage as an interruption of this connection.

3. A car radio with an electronic anti-theft device as claimed in claim 2, characterized in that the comparator stage has overvoltage protection on its inputs which are used for supplying the voltage caused by the constant current on the connection from the car radio to the at least one loudspeaker.

4. A car radio with an electronic anti-theft device as claimed in claim 1, characterized in that the monitoring circuit is additionally supplied with a signal which contains information about whether the car radio is switched on or not and by which the anti-theft device is activated when the car radio is switched off.

5. A car radio with an electronic anti-theft device as claimed in claim 1, characterized in that the anti-theft device can be deactivated by supplying a signal which contains a codeword.

6. A car radio with an electronic anti-theft device as claimed in claim 1, characterized in that the monitoring device comprises energy supply via an additional energy store.

* * * * *